2,933,458

ELECTRICALLY CONDUCTIVE GLASS COMPOSITION CONTAINING SUBOXIDES OF TITANIUM AND METHOD OF MAKING THE SAME

Burnham W. King, Columbus, Ohio, and Harlan P. Tripp, Louisville, Ky., assignors, by mesne assignments, to Diamond Alkali Company, Cleveland, Ohio, a corporation of Delaware No Drawing. Application December 19, 1955
Serial No. 554,105

10 Claims. (Cl. 252—520)

This invention relates to new and improved electrically conductive compositions and to their preparation.

THE PRIOR ART

There has long been considerable interest in the production of a glass or glassy-like material which will conduct electricity sufficiently well to render it feasible for use in many applications where the other inherent properties of glass would make it an ideal material. However, up to this time no completely satisfactory conducting glass has been available, and the problem of providing an electrically conductive glass has remained an intriguing and difficult one.

One type of glass heretofore investigated comprises an electrically conductive film, e.g., $SnO_2$ of metallic deposit, deposited on a glass base. In some instances coated glasses of this type meet the requirements of specific problems. Another prior approach to the problem has been to admix an electrically conducting material with a glass. A further prior approach has been to replace sodium ions in various silicate glasses with lithium ions, thus to obtain a somewhat reduced resistivity. However, in the latter case, the resistivities obtained, while perhaps lower than ordinary glass, still are extremely high by comparison with metallic conductors. Other compositions, such as those containing $Fe_2O_3$, also have been proposed.

OBJECTS OF THIS INVENTION

It is to the provision of a novel electrically conductive composition that the present invention is directed, a principal object being to provide an electrically conductive glass adapted to be employed in various applications.

A further object of the invention is to provide new and improved glass compositions.

A still further object of the invention is to provide new and improved, low cost glass compositions characterized by extremely low electrical resistance.

These and other objects and advantages of the invention will appear more fully from the following description thereof.

THE PRESENT INVENTION

This invention broadly comprises compositions of matter comprising, in combination, an alkali metal oxide, silicon dioxide and at least one reduction product of titanium dioxide, such as TiO, $Ti_2O_3$, $Ti_3O_5$, or the like.

More specifically, a preferred composition of this invention comprises, in combination, an alkali metal oxide, silicon dioxide, at least one reduction product of titanium dioxide, such as TiO, $Ti_2O_3$, $Ti_3O_5$, and the like, and at least one substance selected from the group consisting of alkali fluorides, alkaline earth metal oxides and fluorides, boric oxide and alkali metal silicofluorides.

As those skilled in the art will realize, the alkali metal oxide and silicon dioxide comprise the bulk of the glassy phase in compositions of this invention. Moreover, although the expression "alkali metal oxide," as used herein, is intended to include oxides of the various alkali metals, i.e., sodium potassium, lithium, cesium and rubidium, sodium oxide ($Na_2O$) is probably the most common alkali metal oxide employed in forming various glasses and is the preferred alkali metal oxide in the practice of this invention. Similarly, the expression "alkaline earth metal" as used herein is intended to include the various metals of column 2A of the periodic table, i.e., calcium, strontium, barium, magnesium, etc.

The silicon dioxide, an essential ingredient in the practice of this invention, may comprise sand, silica flour, comminuted silica gel, and the like.

The titanium compound or compounds embodied in compositions of this invention are selected from the reduction products of $TiO_2$ such as TiO, $Ti_2O_3$, and $Ti_3O_5$, $Ti_2O_3$ and TiO being preferred. Of the latter two, TiO generally provides a lower electrical resistivity. In practice, either the desired titanium oxide may be incorporated per se, or, alternatively, a mixture of $TiO_2$ and a reducing agent, e.g., aluminum, titanium, iron, silicon, magnesium, chromium, calcium, strontium, barium, beryllium, zirconium, or the like, may be utilized.

Specific compositions of the invention utilizing TiO generally comprise mixtures of within the following ranges wherein the quantities indicated are in terms of percent by weight:

|  |  | Preferred |
|---|---|---|
| $Na_2O$ | 10–26 | 10–15 |
| $SiO_2$ | 33–55 | 32–40 |
| TiO | 14–35 | 24–35 |
| BaO | 0–13 | 6–13 |
| CaO | 0–7 | 3–7 |
| MgO | 0–7 | 0–5 |
| $B_2O_3$ | 0–13 | 0–7 |
| $Al_2O_3$ | 0–4 |  |
| $Na_2SiF_6$ | 0–7 | 0–4 |

Compositions of the invention which contain $Ti_2O_3$ desirably are as follows:

|  |  | Preferred |
|---|---|---|
| $Na_2O$ | 0–30 | 10–13 |
| $K_2O$ | 0–28 |  |
| $Li_2O$ | 0–10 |  |
| BaO | 0–15 | 10–13 |
| CaO | 0–10 | 5–7 |
| MgO | 0–5 | 0–5 |
| $B_2O_3$ | 0–19 | 0–7 |
| $Al_2O_3$ | 0–10 |  |
| $SiO_2$ | 31–58 | 36–40 |
| $Ti_2O_3$ | 18–45 | 20–25 |
| LiF | 0–5 |  |
| $CaF_2$ | 0–5 | 0–4 |
| $Na_2SiF_6$ | 0–10 | 0–5 |

It has been found that the foregoing compositions are characterized by a singularly low electrical resistance and, hence, excellent conductivity, which conductivity is of an electronic nature characterized by a changing ionic valency under conditions at which the compositions are employed as electrical conductors. The present invention provides compositions in which ions are soluble in the glass phase while in the desired valence state. Moreover, compositions of this invention contain ionic materials characterized by high chemical and vapor pressure stability and which do not crystallize out of the glass phase.

APPLICATIONS OF COMPOSITIONS OF THIS INVENTION

Compositions embodying this invention may be employed in a variety of applications wherein a strong, rigid, corrosion resistant electrically conductive material is desired, such as lightning arresters, textile and film guides where it is essential to preclude or minimize static electricity accumulation, electrodes, as more specifically set forth hereinafter, semi-conductors, circuit components, signal devices for use at predetermined frequencies or wave lengths, bases for electrodeposition of metal, e.g., chromium, nickel, gold, etc., low ohmic resistors, electrical heating devices, e.g., space heaters, anti-freeze and/or antifrost elements, and other applications where the inherent properties of glass render the use of electrically conductive compositions and coatings formed therefrom especially advantageous.

PREPARATION OF COMPOSITIONS OF THIS INVENTION

Generally, the preparation of compositions embodying the invention may be accomplished in various ways. However, the presently preferred method, when reactants in the powdered state are employed, comprises weighing and dry mixing the raw materials, and removing any lumps or other large particles which may be present, typically by forcing the mixture through a 20 mesh sieve. The thus-prepared mixture or, if desired, a mixture of preformed glass and $TiO_2$ with a reducing agent or a lower oxide of titanium, is then smelted in an inert or neutral atmosphere, as in a gas-fired furnace, at a temperature sufficient to provide a mixture of the desired fluidity. Typical smelting temperatures range from about 1300° F. to about 3000° F. While higher temperatures, and, at times, possibly lower temperatures also may be employed, it has been found that if temperatures substantially in excess of 3000° F. are employed, at times certain of the ingredients volatilize out of the mixture.

While the individual compounds included in compositions of this invention may be added as such, it frequently is convenient to incorporate commercially available products which contain the desired constituents and to make any necessary adjustments in composition as dictated by the specific application intended. For example, borax ($Na_2B_4O_7$) may be employed. Convenient sources of $SiO_2$, and $Na_2O$ are commercially available alkali metal silicates, e.g., $Na_2O \cdot 3SiO_2$, $Na_2O \cdot 2SiO_2$ $$Na_2O \cdot 3.25SiO_2$$

and/or $Na_2O \cdot SiO_2 \cdot TiO_2$. Similarly, $F_2$ may be introduced as $Na_2SiF_6$.

Similarly, as indicated hereinbefore, the desired titanium oxide can be added as such or formed in situ during smelting. The following equations, which can be carried out by heating the reactants, typically at 2500° F. for two hours in an argon atmosphere, indicate the preparation of various sub-oxides of $TiO_2$ using Ti as a reducing agent:

(1) $TiO_2 + Ti \rightarrow 2TiO$
(2) $3TiO + Ti \rightarrow 2Ti_2O_3$
(3) $5TiO_2 + Ti \rightarrow 2Ti_3O_5$ The following examples, wherein the proportions are indicated in terms of parts by weight, illustrate various compositions having electrical resistivities of 200 ohm-cm. or less as measured by a Simpson Ohmeter, said ohmeter being more specifically described in U.S. Patent 2,051,399.

Other illustrative compositions in accordance with this invention, wherein the quantities expressed in terms of percent by weight and which are characterized by low resistances are set forth in the following examples:

Example 18

| | |
|---|---|
| $Na_2O$ | 20.0 |
| $SiO_2$ | 45.3 |
| $Ti_2O_3$ | 34.7 |

Example 19

| | |
|---|---|
| $Na_2O$ | 15.0 |
| $SiO_2$ | 40.0 |
| $Ti_2O_3$ | 35.5 |
| $Al_2O_3$ | 9.5 |

Example 20

| | |
|---|---|
| $Na_2O$ | 10.0 |
| $SiO_2$ | 40.0 |
| $Ti_2O_3$ | 40.5 |
| $Al_2O_3$ | 9.5 |

Example 21

| | |
|---|---|
| $Na_2O$ | 13.3 |
| $BaO$ | 10.0 |
| $CaO$ | 5.0 |
| $B_2O_3$ | 6.9 |
| $SiO_2$ | 36.3 |
| $TiO$ | 25.0 |
| $Na_2SiF_6$ | 3.5 |

Example 22

| | |
|---|---|
| $Na_2O$ | 13.3 |
| $BaO$ | 6.0 |
| $CaO$ | 3.0 |
| $B_2O_3$ | 6.9 |
| $SiO_2$ | 32.8 |
| $TiO$ | 34.5 |
| $Na_2SiF_6$ | 3.5 |

Example 23

| | |
|---|---|
| $Na_2O$ | 17.9 |
| $SiO_2$ | 57.7 |
| $Ti_2O_3$ | 24.4 |

Example 24

| | |
|---|---|
| $Na_2O$ | 26.0 |
| $SiO_2$ | 43.5 |
| $Ti_2O_3$ | 30.5 |

Example 25

| | |
|---|---|
| $Na_2O$ | 30.0 |
| $SiO_2$ | 52.0 |
| $Ti_2O_3$ | 18.0 |

Example 26

| | |
|---|---|
| $Na_2O$ | 28.4 |
| $SiO_2$ | 48.2 |
| $Ti_2O_3$ | 23.4 |

| Example No. | $Na_2O$ | $SiO_2$ | $TiO_2$ | $TiO$ | $Ti_2O_3$ | Al | $B_2O_3$ | $F_2$ | BaO | CaO | MgO | $CaF_2$ | Resistivity, Ohms./Cm. |
|---|---|---|---|---|---|---|---|---|---|---|---|---|---|
| 1 | 10 | 40 | 45 | | | 5 | | | | | | | 60 |
| 2 | 15 | 40 | 40 | | | 5 | | | | | | | 30 |
| 3 | 15 | 24.8 | | | 43.4 | | 16.8 | | | | | | 200 |
| 4 | 21.7 | 41.6 | | | 34.8 | | | 3.2 | | | | | 200 |
| 5 | 22.3 | 35.0 | | | 34.8 | | 6.1 | 3.2 | | | | | 150 |
| 6 | 18.9 | 38.3 | | | 34.8 | | 6.1 | 3.2 | | | | | 150 |
| 7 | 22.3 | 38.3 | | 35 | | | 6.1 | 3.2 | | | | | 20 |
| 8 | 15.6 | 46.1 | | 26.4 | | | 9.0 | 3.6 | | | | | 50 |
| 9 | 25.8 | 34.0 | 15.0 | | 12.2 | | 6.8 | 4.2 | | | | | 10 |
| 10 | 15.6 | 45.0 | | 30.0 | | | 6.0 | 3.6 | | | | | 30 |
| 11 | 10 | 40 | | | 20 | | | | 15 | 10 | 5 | | 70 |
| 12 | 10 | 40 | | 25 | | | | | 13 | 7 | 5 | | 10 |
| 13 | 10 | 40 | | | 25 | | | | 13 | 4.9 | 3.5 | 3.6 | 24 |
| 14 | 10 | 40 | | 25 | | | | | 13 | 4.9 | 3.5 | 3.6 | 4 |
| 15 | 14.3 | 34.6 | | | 25 | | 6.1 | 2.1 | 10 | 5 | | | 200 |
| 16 | 14.3 | 34.6 | | 25 | | | 6.1 | 2.1 | 10 | 5 | | | 5 |
| 17 | 14.3 | 33.1 | | 34.5 | | | 6.1 | 2.1 | 6 | 3 | | | 2 |

Example 27

| | |
|---|---|
| $K_2O$ | 28.0 |
| $SiO_2$ | 48.0 |
| $Ti_2O_3$ | 24.0 |

Example 28

| | |
|---|---|
| $Na_2O$ | 15.0 |
| $Li_2O$ | 5.0 |
| $SiO_2$ | 45.2 |
| $Ti_2O_3$ | 34.8 |

Glasses of the foregoing types may be employed in various applications where a glass characterized by relatively low resistivity is desired. As the data indicates, the electrical conductivity varies sharply with the precise composition employed. Hence, those skilled in the art will recognize that variations of the above illustrative compositions may be made within the scope of this invention in order to meet a specific application.

One application for compositions of this invention is in the field of electrolytic electrodes. Such electrodes may comprise a glass of this invention either as a solid electrode element formed in the desired shape, as a glass coating on a metal base or, if desired, in admixture with various ceramic materials. For example, glasses of the foregoing types can be formed into electrodes by pouring the molten glass into a crucible and inserting thereinto, while molten, a stainless steel rod. Those skilled in the art will appreciate, of course, that other forms of electrodes also may be formed. At times, particular care should be taken to match the material serving as a base or support for the glass so that the coefficients of expansion do not differ substantially or do not otherwise cause difficulty.

Example 30

To illustrate the use of compositions of this invention as electrodes, the following mixtures are prepared, the quantities set forth being in terms of percent by weight:

| | 1 | 2 | 3 | 4 | 5 | 6 |
|---|---|---|---|---|---|---|
| $Na_2O$ | 13.3 | 13.3 | 10.0 | 13.0 | 10.0 | 10.0 |
| $SiO_2$ | 36.3 | 32.8 | 40.0 | 36.3 | 40.0 | 40.0 |
| $TiO$ | 25.0 | 34.5 | 25.0 | | | |
| $Ti_2O_3$ | | | | 25.0 | 25.0 | 25.0 |
| $BaO$ | 10.0 | 6.0 | 13.0 | 10.0 | 13.0 | 13.0 |
| $CaO$ | 5.0 | 3.0 | 7.0 | 5.0 | 4.9 | 7.0 |
| $B_2O_3$ | 6.9 | 6.9 | | 6.9 | | |
| $Na_2SiF_6$ | 3.5 | 3.5 | | 3.5 | | |
| $MgO$ | | | 5.0 | | 3.5 | 5.0 |
| $CaF_2$ | | | | | 3.6 | |

Electrodes are prepared from compositions 1–6 above by smelting at 2700–3000° F. and casting into iron crucibles, stainless steel rods being inserted in the compositions prior to solidification, to form electrodes are about 1 inch in diameter, 1 inch long and tapered to a diameter of ½ inch at one end. The surfaces of the thus-formed glass electrodes are ground to present clean surfaces to the testing solution.

Using such electrodes, a series of experiments are conducted by placing the electrodes each in 250 ml. glass beakers with stainless steel cathodes spaced 1⅛ inch from the glass anodes, there being about 4 square inches of immersed anode area and 15 square inches of cathode area. Employing a 25% by weight NaCl flowing solution as electrolyte, a cell voltage of 12 volts is maintained. Similar experiments are conducted, with substantially the same results, using as electrolytes, a solution comprising 10 gms. $SnCl_2$ and 10 ml. HCl diluted to 200 ml., and a solution comprising 10 gms. oxalic acid and 5 ml. $H_2SO_4$ diluted to 200 ml. During the electrolysis, a drop in amperage under the conditions employed is observed, the amperage resuming its initial values upon reversal of the current.

It is to be understood that although the invention has been described with specific reference to particular embodiments thereof, it is not to be so limited, since changes and alterations therein may be made which are within the full intended scope of this invention as defined by the appended claims.

What is claimed is:

1. A fused glass composition consisting essentially of 10–30% by weight of an alkali metal oxide, 31–58% by weight of $SiO_2$, 14–45% by weight of an oxide of titanium selected from the group consisting of TiO, $Ti_2O_3$, $Ti_3O_5$, and mixtures thereof, and the additional components being selected from the following group and in the amounts shown:

| | Percent by weight |
|---|---|
| $BaO$ | 0–15 |
| $CaO$ | 0–10 |
| $MgO$ | 0–5 |
| $B_2O_3$ | 0–19 |
| $Al_2O_3$ | 0–10 |
| $LiF$ | 0–5 |
| $CaF_2$ | 0–5 |
| $Na_2SiF_6$ | 0–10 |

2. The composition of claim 1 wherein the oxide of titanium selected from said group is TiO.

3. The composition of claim 1 wherein the oxide of titanium is $Ti_2O_3$ and the percentage thereof is within the range of 18–45% by weight.

4. The composition of claim 1 wherein the oxide of titanium selected from said group is a mixture of TiO and $Ti_2O_3$.

5. The composition of claim 1 wherein said alkali metal oxide is sodium oxide.

6. An electrode formed of the composition of claim 1.
7. An electrode formed of the composition of claim 2.
8. An electrode formed of the composition of claim 3.
9. An electrode formed of the composition of claim 4.

10. The method of preparing an electrically conductive glass composition, said method comprising the steps of heating together at a temperature substantially within the range of 1300° and 3000° F. a comminuted dry mixture of an alkali metal oxide in an amount within the range of 10–30% by weight of said composition, silicon dioxide in an amount from 31–58% by weight of said composition, from 14% to 45% by weight of an oxide of titanium selected from the group consisting of TiO, $Ti_2O_3$, $Ti_3O_5$, and mixtures thereof, and the additional components being chosen from the group consisting of the following and in the amounts shown:

| | Percent by weight |
|---|---|
| $BaO$ | 0–15 |
| $CaO$ | 0–10 |
| $MgO$ | 0–5 |
| $B_2O_3$ | 0–19 |
| $Al_2O_3$ | 0–10 |
| $LiF$ | 0–5 |
| $CaF_2$ | 0–5 |
| $Na_2SiF_6$ | 0–10 | the temperature at which the components of said composition are heated within said range being sufficient to provide a substantially uniform molten mixture thereof, and cooling said molten mixture sufficiently to form a solid glass.

References Cited in the file of this patent

UNITED STATES PATENTS

| | | |
|---|---|---|
| 2,289,211 | Ridgway | July 7, 1942 |
| 2,497,235 | Perley | Feb. 4, 1950 |
| 2,587,916 | Squier | Mar. 4, 1952 |
| 2,786,819 | Smith | Mar. 26, 1957 |

OTHER REFERENCES

Kreimer, G. S.: "Simultaneous Reduction of Oxides of Iron, Titanium and Columbium with Aluminum," Jour. Applied Chem. (U.S.S.R.), 13, 1267–70; in French p. 1271 (1940).

Zapffe, C. A.: "Conversion of Certain Refractory Oxides to a Suboxide Form at High Temperatures," J. Am. Ceram. Soc. 27 (10), 293–98 (1944).